UNITED STATES PATENT OFFICE.

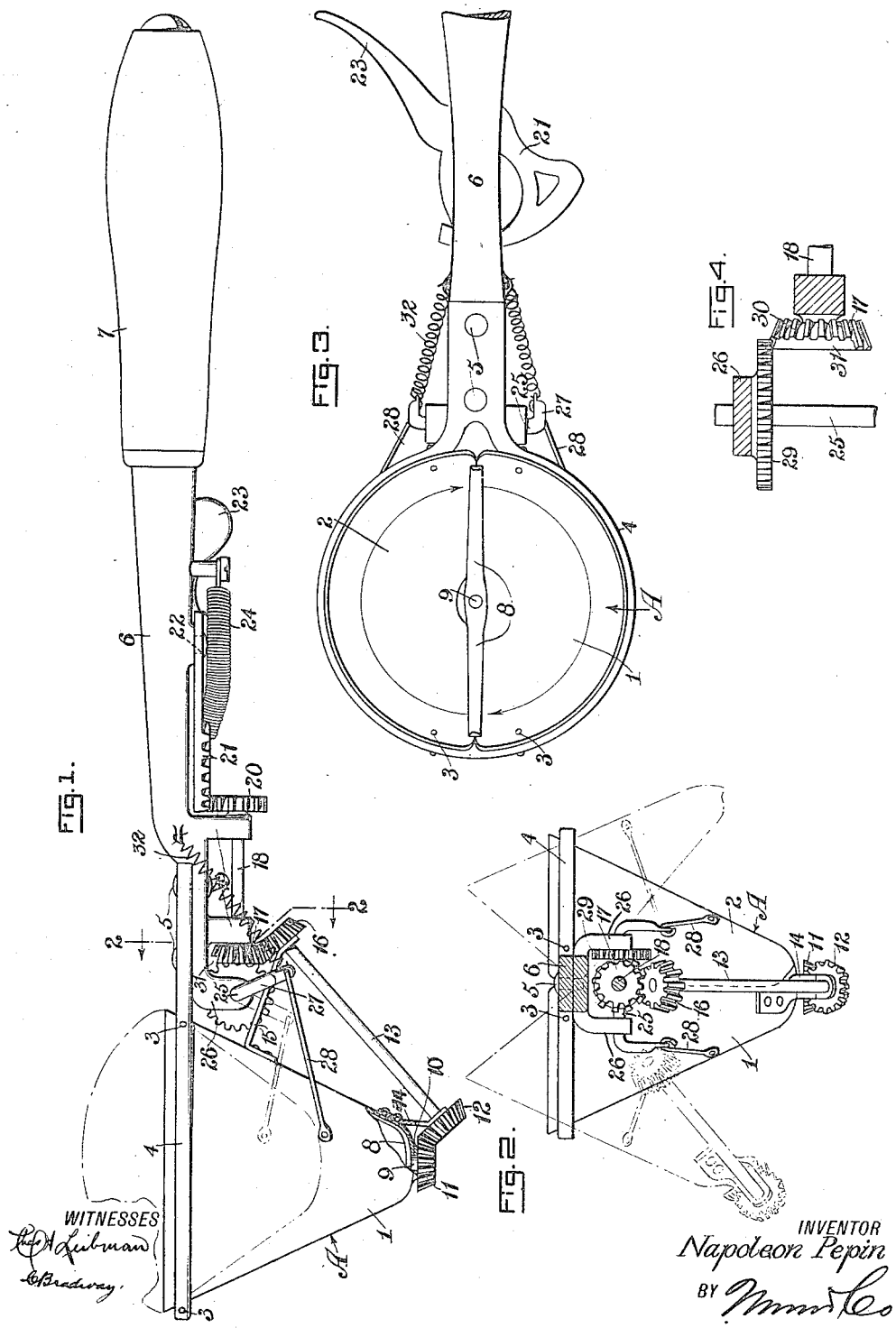

NAPOLEON PEPIN, OF WOONSOCKET, RHODE ISLAND.

ICE-CREAM-CONE DISHER.

1,255,785.

Specification of Letters Patent.

Patented Feb. 5, 1918.

Application filed June 12, 1917. Serial No. 174,235.

*To all whom it may concern:*

Be it known that I, NAPOLEON PEPIN, a citizen of the United States, and a resident of Woonsocket, in the county of Providence and State of Rhode Island, have invented a new and Improved Ice-Cream-Cone Disher, of which the following is a full, clear, and exact description.

This invention relates to an ice cream scoop or disher especially adapted for molding ice cream into conical shape so that it will fit into a holder commonly called an ice cream "cone."

The invention has for its general objects to improve the construction and operation of devices of this character so as to be reliable and efficient in use, comparatively simple and inexpensive to manufacture, and so designed as to mold the ice cream into the desired shape in the act of dishing or scooping the ice cream from the can.

A more specific object of the invention is the provision of an ice cream disher including a bowl or mold made of two sections and in which is arranged a scraper, there being novel means for first operating the scraper to loosen the ice cream from the wall of the bowl and then to open the bowl by throwing the sections thereof apart, whereby the conical body of ice cream can drop point downward into an ice cream cone.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of the ice cream disher;

Fig. 2 is a transverse section on the line 2—2, Fig. 1;

Fig. 3 is a plan view; and

Fig. 4 is a detail view of parts of the gearing.

Referring to the drawing, A designates a bowl which is centrally divided into two semi-conical shell-like sections 1 and 2 which are mounted to swing on pivots 3 which are attached to a ring 4 that surrounds the open top of the mold or body A. This ring is rigidly fastened by rivets or equivalent means 5 to a shank 6 which is provided with a handle 7.

In the bowl A is a V-shaped scraper 8 which is provided with a pivot stud 9 in a bearing 10 in the section 1 of the bowl, and on this stud 9 is bevel gear 11 which meshes with a bevel gear 12 on an inclined shaft 13. This shaft 13 is connected with the section 1 of the bowl by being journaled in brackets 14 and 15 fastened to the said section of the bowl. The shaft 13 is provided with a bevel gear 16, which in turn meshes with a bevel gear 17 on a horizontal shaft 18 journaled in bearing lugs 19 on the shank 6. On the shaft 18 is a pinion 20 which meshes with a toothed sector 21 fulcrumed on the shank 6 at 22, the sector having a thumb-piece 23 whereby the thumb of the hand gripping the handle 7 can be used to operate the toothed sector, which in turn causes the scraper 8 to rotate. The toothed sector is returned to normal position by the usual spring 24. The toothed sector or lever 21 is also employed to move the two sections 1 and 2 of the bowl to open position, that is to say, from the full to the broken-line position, Fig. 2, so that the ice cream loosened by the scraper can drop out of the bowl. A transverse rock shaft 25 is journaled in spaced bearings 26 formed on the end of the shank 6 and the extremities of the rock shaft terminate in depending crank arms 27 which are connected by links 28 with the sections 1 and 2 of the bowl A, so that when the arms 27 rock from their normal full-line position, Fig. 1, to the dotted-line position, the two sections 1 and 2 of the bowl A will swing open, as shown in Fig. 2. On the rock shaft 25 is a gear 29 which meshes with a mutilated gear on the shaft 18, so that the two sections 1 and 2 will not open until after the scraper 8 has been first actuated so as to loosen the ice cream from the bowl A. If desired, the gear 17 may serve the place of a mutilated gear to rotate the pinion 29. Thus part of the teeth 30 can be cut away at 31, whereby the gear 17 can rotate without turning the pinion 29 while the scraper is in operation, and then by continued rotation of the gear 17 the pinion 29 will be turned to open the bowl to allow the loosened ice cream to drop out.

The scraper is adapted to make a half turn so that it will lie within that section in which it is mounted and thereby not interfere with the dropping out of the ice cream when the scoop is opened.

Since the gear 17 is normally out of mesh with the pinion 29, means must be provided for preventing the section of the bowl from moving open during the scooping up of the ice cream. Any suitable means may be provided for this purpose, such as one or more springs 32 which are connected with the crank arms 27 and with the shank 6. These springs yield when the lever 23 is operated during that part of the movement of the latter which moves the sections 1 and 2 of the bowl A.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A device of the class described comprising a bowl composed of relatively movable sections, a supporting structure, the upper portions of the sections being pivotally mounted in the said structure on parallel axes, whereby the lower ends of the sections will swing outwardly away from each other to permit the ice cream to drop between the sections, a scraper mounted on one of the sections, a mechanism mounted on the structure and connected with the scraper for turning the same, a shaft mounted on the structure, a lost motion connection between the mechanism and shaft, whereby the shaft is idle while the scraper is operating, and connections between the shaft and the two sections of the bowl for moving the sections to open position during further movement of the said mechanism.

2. A device of the class described comprising a bowl divided into two sections, a ring surrounding the bowl and slightly smaller in diameter than the top of the bowl, and pivots connecting the upper portions of the sections to the ring at points at opposite sides of the plane of division of the bowl, whereby the sections can swing in opposite directions, a handle to which the ring is fastened, a scraper mounted on one of the sections of the bowl, a mechanism mounted on the handle and operatively connected with the scraper for turning the same, arms mounted on the handle, links connecting the arms with the sections of the bowl for moving the latter, means between the mechanism and arms for simultaneously actuating the latter after the operation of the scraper, and means for yieldingly holding the bowl sections closed.

3. A device of the class described comprising a supporting structure, a bowl divided into two sections, pivots between the sections of the bowl and the supporting structure, a scraper mounted on one of the sections of the bowl, a shaft mounted on the same section, a gearing between the shaft and scraper, and actuating mechanism mounted on the structure and having a geared connection with the said shaft, a rock shaft mounted on the said structure, arms on the rock shaft, links connecting the arms with the sections of the bowl, and a mutilated gearing between the said mechanism and rock shaft, whereby the scraper is operated before the rock shaft is actuated to open the bowl.

NAPOLEON PEPIN.